United States Patent [19]

Thompson et al.

[11] Patent Number: 5,409,083
[45] Date of Patent: Apr. 25, 1995

[54] MODULAR PORTABLE TREE STAND

[76] Inventors: Kevin G. Thompson, 5838 Steffins Ave., Toledo, Ohio 43623; Randall L. Bauman, 22726 Toledo St., Curtice, Ohio 43412

[21] Appl. No.: 210,873

[22] Filed: Mar. 17, 1994

[51] Int. Cl.⁶ .................................................. A45F 3/26
[52] U.S. Cl. ...................................... 182/187; 108/152
[58] Field of Search .................. 182/187, 188, 133–136; 108/152

[56] References Cited

U.S. PATENT DOCUMENTS

| | | | |
|---|---|---|---|
| 1,712,974 | 5/1929 | Venard. | |
| 3,598,201 | 8/1971 | Thurmond | 182/92 |
| 4,475,627 | 10/1984 | Eastridge | 182/187 |
| 4,782,918 | 11/1988 | Brunner | 182/187 |
| 4,819,763 | 4/1989 | Grote | 182/187 |
| 4,830,143 | 5/1989 | Fisher | 182/135 |
| 4,936,416 | 6/1990 | Garon | 182/187 |
| 5,064,020 | 11/1991 | Eagleston | 182/20 |
| 5,131,496 | 7/1992 | White | 182/187 |
| 5,143,177 | 9/1992 | Smith | 182/187 |
| 5,199,527 | 4/1993 | Jennings | 182/187 |
| 5,257,677 | 11/1993 | Stepp | 182/187 |

OTHER PUBLICATIONS

Bow Hunters Discount Warehouse, Inc. (Summer Edition 1993) pp. 114–134.

*Primary Examiner*—Alvin C. Chin-Shue
*Attorney, Agent, or Firm*—Willian Brinks Hofer Gilson & Lione

[57] ABSTRACT

A tree stand utilized by hunters and outdoorsmen to provide an elevated view. The tree stand includes a support bracket adapted to be secured to a tree or pole, a strap for securing the support bracket to the tree or pole, a platform including a generally flat planar member for supporting at least one person; and means for releasably interlocking the platform and the support bracket by pivoting the platform with respect to the support bracket to interlock the platform and the support bracket and prevent the platform from inadvertently separating from the support bracket. If desired, the platform may be removed from the support bracket and moved to other trees having extra support brackets as required.

13 Claims, 4 Drawing Sheets

MODULAR PORTABLE TREE STAND

FIELD OF THE INVENTION

The present invention relates generally to tree stands utilized by hunters and outdoorsmen. More particularly, the present invention relates to an improved modular portable tree stand including an interlocking support bracket and platform that may be simply assembled and disassembled as desired.

BACKGROUND OF THE INVENTION

A wide variety of portable tree stands are currently in use. Outdoorsmen such as campers, naturalists and hunters carry the tree stands into wooded areas to provide an elevated position and a wide field of view while at the same time shielding the hunter from detection by forest wildlife. The tree stands are typically secured to the trunk of a tree at a desired elevation for use. However, the tree stands can also be used to provide comfortable and convenient seating at a normal chair height.

Generally, there are two different types of portable tree stands. The first type of portable tree stand is a one piece folding tree stand that fastens around the trunk of the tree. The second type of portable tree stand is a climbing tree stand that is typically formed in two pieces that wedge themselves against the trunk of the tree.

Each type of tree stand has certain disadvantages. In many instances, the tree stand is utilized in a remote location that is not easily accessible by motor vehicle such that the user must carry the tree stand to the location where it will be used. In addition to the problem of portability, tree stands are quite often stolen by other outdoorsmen because many outdoorsmen have a favorite location and leave the tree stand unattended when not in use rather than removing and taking the tree stand with them. In addition, many outdoorsmen find it desirable to move the tree stand from one location to the other but this action typically requires multiple tree stands for each location or the complete removal of the stand from the tree and relocation to the other tree. Positioning and securing single piece tree stands in a tree can also be difficult due to the height involved and the awkward shape of the tree stand.

Although, the many different types of tree stands have been proven to perform satisfactorily, further improvements on the deign and function of tree stands is desired. It is an object of the present invention to provide a modular portable tree stand that is simple to install and remove from a tree. Yet another object of the present invention is to provide a tree stand made of modular components that are interchangeable with other like tree stands. It is another object of the present invention to provide a tree stand that may be partially dismantled and then attached to a part of a tree stand installed on another tree. A further object of the present invention is to provide a modular portable tree stand that is lightweight and rigidly constructed and easily transportable and may be used on a variety of trees having different trunk diameters.

SUMMARY OF THE INVENTION

Briefly, the present invention relates to a tree stand. The tree stand includes a support bracket adapted to be secured to a tree or pole; a strap for securing the support bracket to the tree or pole; a platform including a generally flat planar member for supporting at least one person; and means for releasably interlocking the platform and the support bracket by pivoting the platform with respect to the support bracket to interlock the platform and the support bracket and prevent the platform from inadvertently separating from the support bracket. The support bracket includes a frame having a first pair of cleats attached to a top end of the frame and a second pair of cleats attached to a bottom end of the frame. The frame of the support bracket includes two parallel spaced members interconnected by a top brace and a bottom brace. The top brace is connected to each member and extends across an inside of a corner formed at a juncture of each member and each top cleat and the bottom brace extends between and is connected to each bottom cleat of each member a selected distance from a corner formed by each bottom cleat and each member.

In one embodiment, the interlocking means includes a pair of plates secured to a rearward end of the platform and a fastening bar of a cylindrical shape extending between members and parallel with and in close proximity to the bottom brace. The plates extend perpendicular to a longitudinal length of the bottom brace and each include a slot. The slot is of a size to receive the fastening bar such that as the slot is slid over the fastening bar and the platform is pivoted upward a forward edge of each plate is presented in contact with the bottom brace to interlock the plate between the fastening bar and the bottom brace to prevent the platform from inadvertently separating from the support bracket.

In another embodiment, the interlocking means includes a pair of plates having a forward edge and a rearward edge and a fastening bar extending between members. Each plate has a slot which extends from the rearward edge of the plate forward to a rounded end having a diameter greater than the slot width. The fastening bar has a cylindrical shape and has formed therein at least one pair of opposing flat surfaces. The fastening bar diameter is greater than a distance between the opposing flat surfaces and the width of the slot. The distance between the opposing flat surfaces is less than the width of the slot such that the platform is attached to the support bracket by aligning an opening of each slot with the flat surfaces of the fastening bar and sliding the slot over the flat surfaces of the fastening bar until the fastening bar is positioned within the rounded end and then pivoting the platform upward such that the flat surfaces are no longer aligned with the slot and the wider portion of the cylindrical fastening rod abuts against the slot thereby interlocking the platform with respect to the support bracket.

The platform is retained in a raised position generally perpendicular to the support bracket by a pair of cables attached at one end to the platform and at the other end to the support bracket.

BRIEF DESCRIPTION OF THE DRAWINGS

Further features and other objects and advantages of this invention will become clear from the following detailed description made with reference to the drawings in which.

DESCRIPTION OF THE PREFERRED EMBODIMENTS

Figure 1:
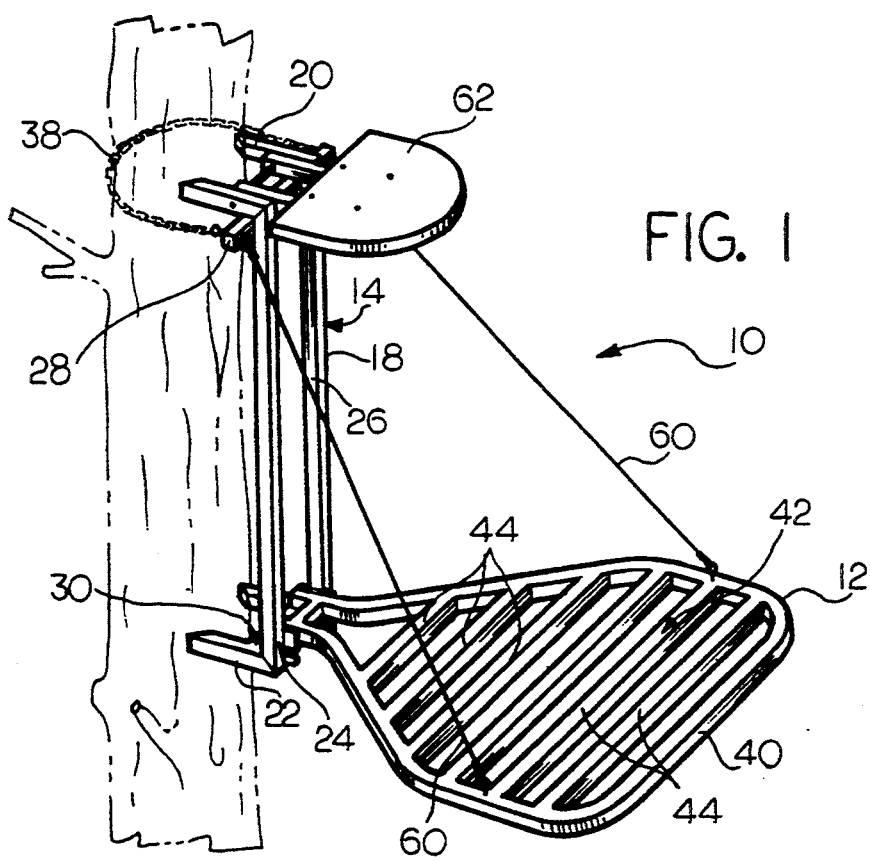
FIG. 1 is a perspective view of a tree stand in accordance with the present invention secured to the trunk of a tree.

In the following description, like reference characters designate like or corresponding parts throughout the several views. Also in the following description, it is to be understood that such terms as "forward", "rearward", "upwardly", "downwardly", and the like are words of convenience and are not to be construed as limiting terms.

Referring to the drawings, there is shown in FIG. 1, a tree stand 10 including a platform 12 and a support bracket 14 attached by a strap 38 such as a chain or the like to a tree. The support bracket 14 includes a frame 18 having a first pair of cleats 20 attached to a top end of the frame and a second pair of cleats 22 attached to the bottom end of the frame. The support bracket 14 may be of most any suitable design and construction. However, for ease of transport and durability, the platform 12 and support bracket 14 are preferably formed of a lightweight tubular metal framework.

Figures 2, 3, 4:
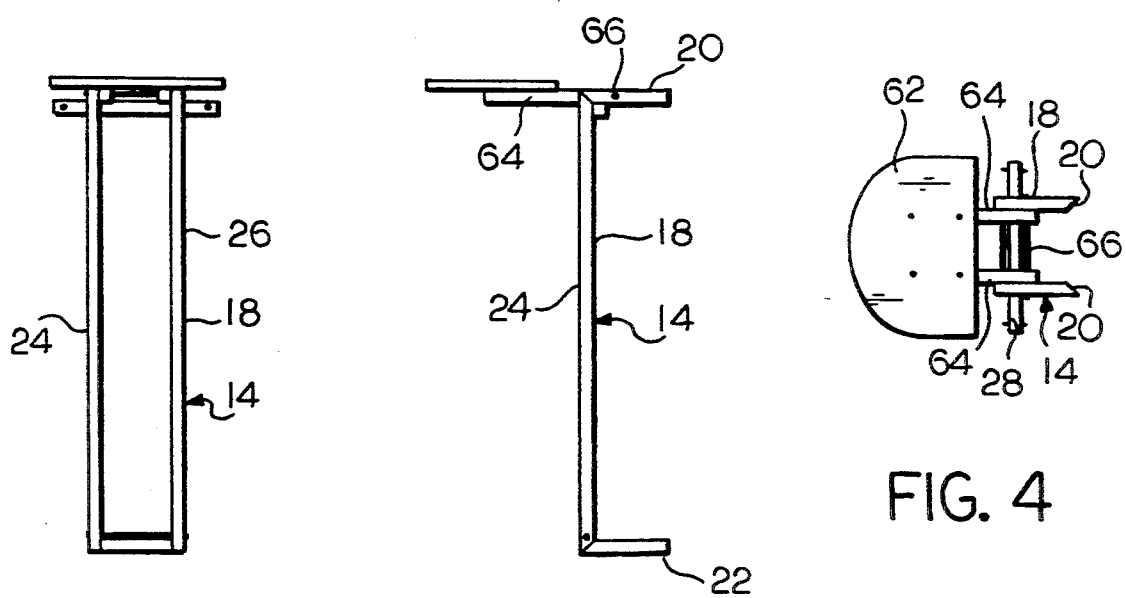
FIG. 2 is a front view of a support bracket of the tree stand of FIG. 1.
FIG. 3 is a side view of the support bracket of FIG. 2.
FIG. 4 is a top view of the support bracket of FIG. 3.

In a preferred embodiment, the frame 18 is formed of two parallel spaced members 24 and 26 interconnected by a top brace 28 and a bottom brace 30. A top cleat 20 and a bottom cleat 22 are attached to each member 24 and 26. The top cleat 20 and the bottom cleat 22 project perpendicularly from the members 24 and 26 to maintain the support bracket 14 a spaced distance from the tree surface thereby accommodating tree surfaces having varying surface contours. As shown in FIGS. 1 and 4, each pair of cleats 20 and 22 has a complimentary tapered front end 32 to grasp the circumference of the tree surface and provide stability to the tree stand 10 when secured to the tree. Each spaced member 24 or 26 and respective top cleat 20 and bottom cleat 22 may be formed of individual tubular sections connected by welding and the like or each spaced member and respective top cleat and bottom cleat may be formed from a single piece of tubular material bent to generally conform to the c-shape as shown in the drawings.

Referring to FIGS. 1, 2 and 6-8, the members 24 and 26 are maintained in a parallel racked position by the top brace 28 and the bottom brace 30. The top brace 28 is connected to each member 24 and 26 and extends across the inside of the corner formed at the juncture of each member and each top cleat 20. Similarly, the bottom brace 30 extends between and is connected to each bottom cleat 22 of each member 24 and 26 a selected distance from the corner formed by the bottom cleats and each member 24 and 26.

To secure the support bracket 14 to the tree a strap 38 such as a chain or the like is attached to opposing ends of the top brace 28. The strap 38 and the top brace 28 cooperatively surround the tree to fix the support bracket 14 with respect to the tree surface. As shown in FIG. 1, the strap 38 is fastened to one end of the top brace 28 and then wrapped tightly around a portion of the tree and then fastened to the opposing end of the top brace. As the strap 38 spans tightly across a portion of the tree, the cleats 20 and 22 are forced against the tree surface such that the support bracket 14 is drawn tightly against the tree surface to fix the support bracket relative to the tree.

Figure 5:
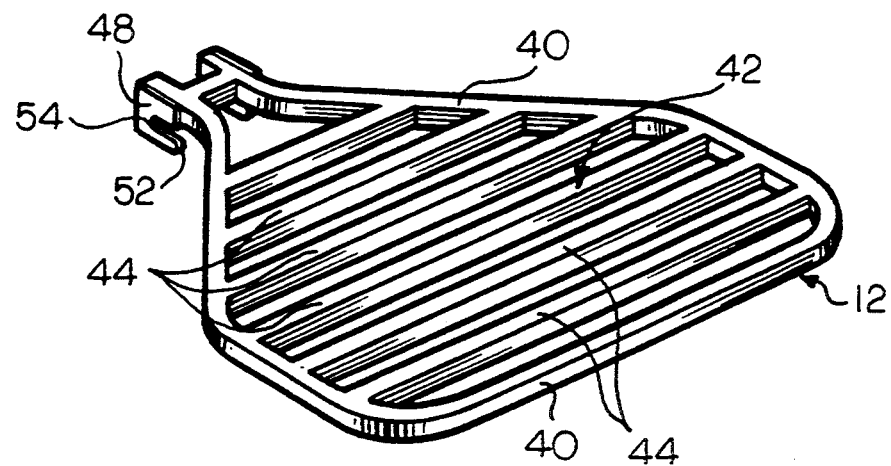
FIG. 5 is a perspective view of the platform of the tree stand of FIG. 1.

Releasably interlocked to the support bracket 14 is the platform 12. The platform 12 is a generally flat planar member on which the outdoorsmen stand. It will be appreciated that the platform 12 may be of most any suitable shape, size and material as desired to support the outdoorsmen. In a preferred embodiment, for simplicity and ease of transport, the platform 12 is of a one-piece compact construction having an outer band 40 and a deck 42 extending between the outer band. The outer band 40 may be constructed by bending a one-piece tubular material to the desired shape or the outer band may be formed of individual tubular materials joined by welding or the like. As shown in FIGS. 1 and 5, the outer band 40 is in the general shape of a rectangle having a tapered forward end and rounded rearward corners. The deck 42 of the platform 12 is formed of a plurality of interconnecting cross pieces 44 extending between the outer band 40. In a preferred embodiment, the cross pieces 44 are formed of a plurality of spaced tubular material positioned across the outer band 40 and attached to the outer band at the periphery. In an alternative embodiment, the deck 42 of the platform 12 may be formed of a lightweight open metal or plastic mesh which is fastened to the outer band 40. It will be appreciated that a platform 12 having a one-piece compact construction in accordance with the present invention is easier and quieter to transport through the forest in contrast to tree stands or platforms having moving elements or that are bulky and cumbersome to carry.

Figure 6:
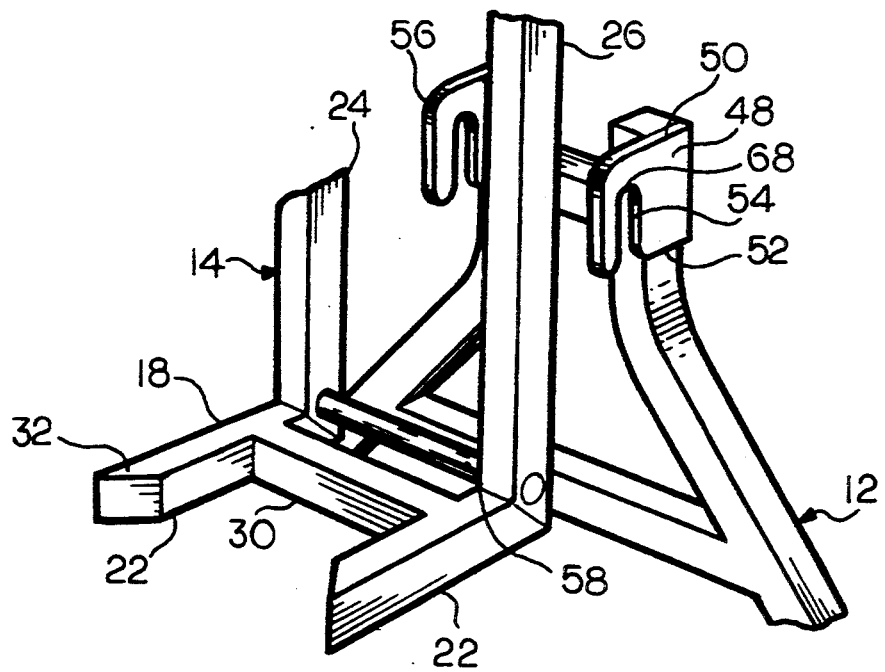
FIG. 6 is an exploded partial view of the platform and support bracket of the tree stand.
Figure 7:
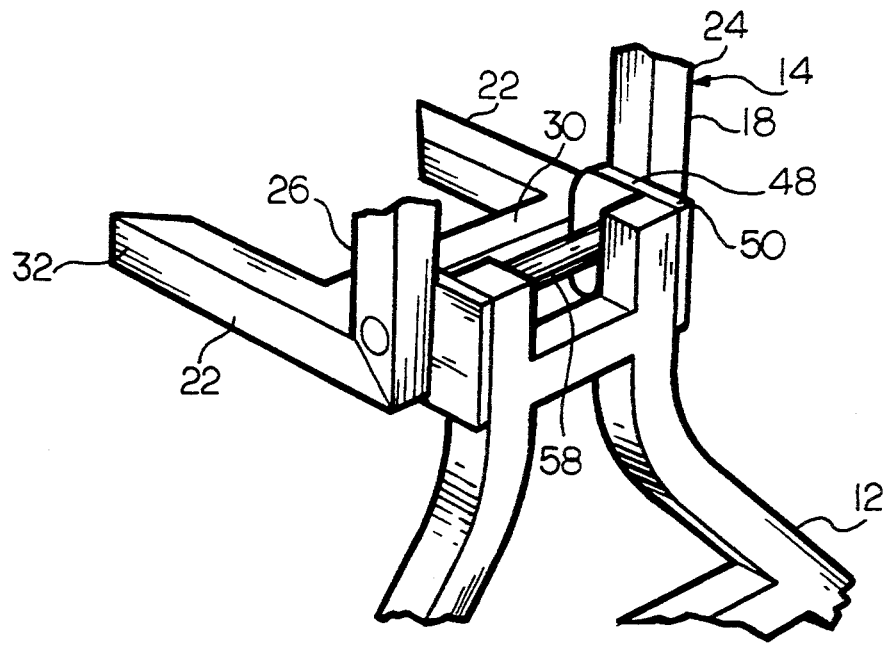
FIG. 7 is a partial view of the platform and support bracket of the tree stand illustrating the connection of the platform to the support bracket.
Figure 8:
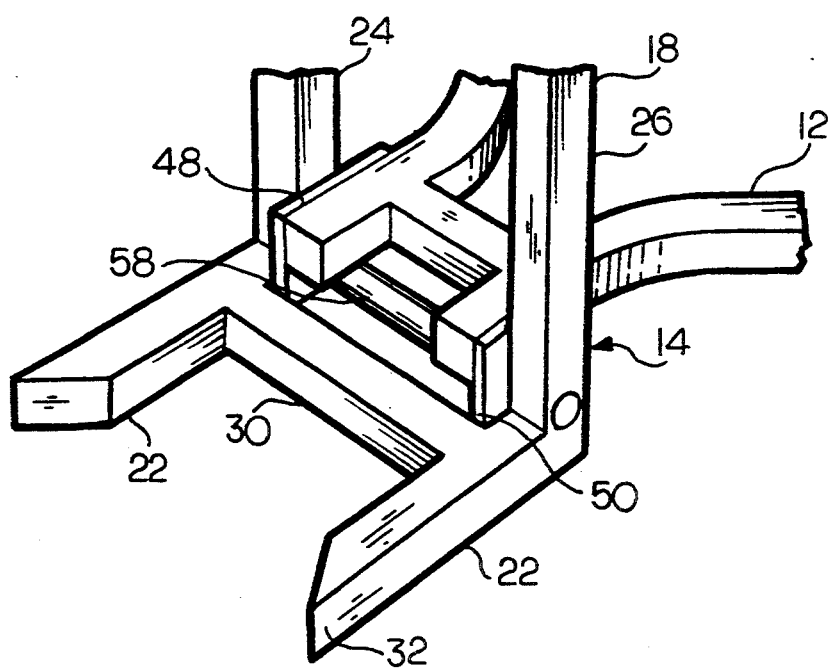
FIG. 8 is a partial view of the platform and support bracket of the tree stand illustrating the platform pivotally fixed with respect to the support bracket.

As shown in FIGS. 6-8, the present invention includes a means for releasably interlocking the platform 12 to the support bracket 14. In one embodiment, the interlocking means includes a plate 48 secured to the rearward end of the platform 12 and a fastening bar 58 of a cylindrical shape extending between members 24 and 26 and parallel with and in close proximity to the bottom brace 30 (FIG. 6). The plate 48 has a forward edge 50 and a rearward edge 52. The plate 48 extends perpendicular to the longitudinal length of the bottom brace 30 and includes a slot 54. The slot 54 is sized to receive the fastening bar 58 and extends from the rearward edge 52 of the plate forward to a rounded end 68.

The platform 12 is interlocked with the support bracket 14 by positioning the opening of each slot 54 over the fastening bar 58. The slot 54 is then slid over the fastening bar 58 (FIG. 7) and the platform 12 is pivoted upward. The forward edge 50 of each plate 48 includes a rounded lower corner 56 to allow the lower corner of each plate to pivot past the bottom brace 30 perpendicular to the support bracket 14 thereby presenting the forward edge of each plate in contact with the bottom brace. In an alternative embodiment, the forward edge 50 of each plate 48 includes a rounded upper and lower corner. The plate 48 is then interlocked between the fastening bar 58 and bottom brace 30 such that the platform 12 is prevented from inadvertently separating from the support bracket.

Figure 9:
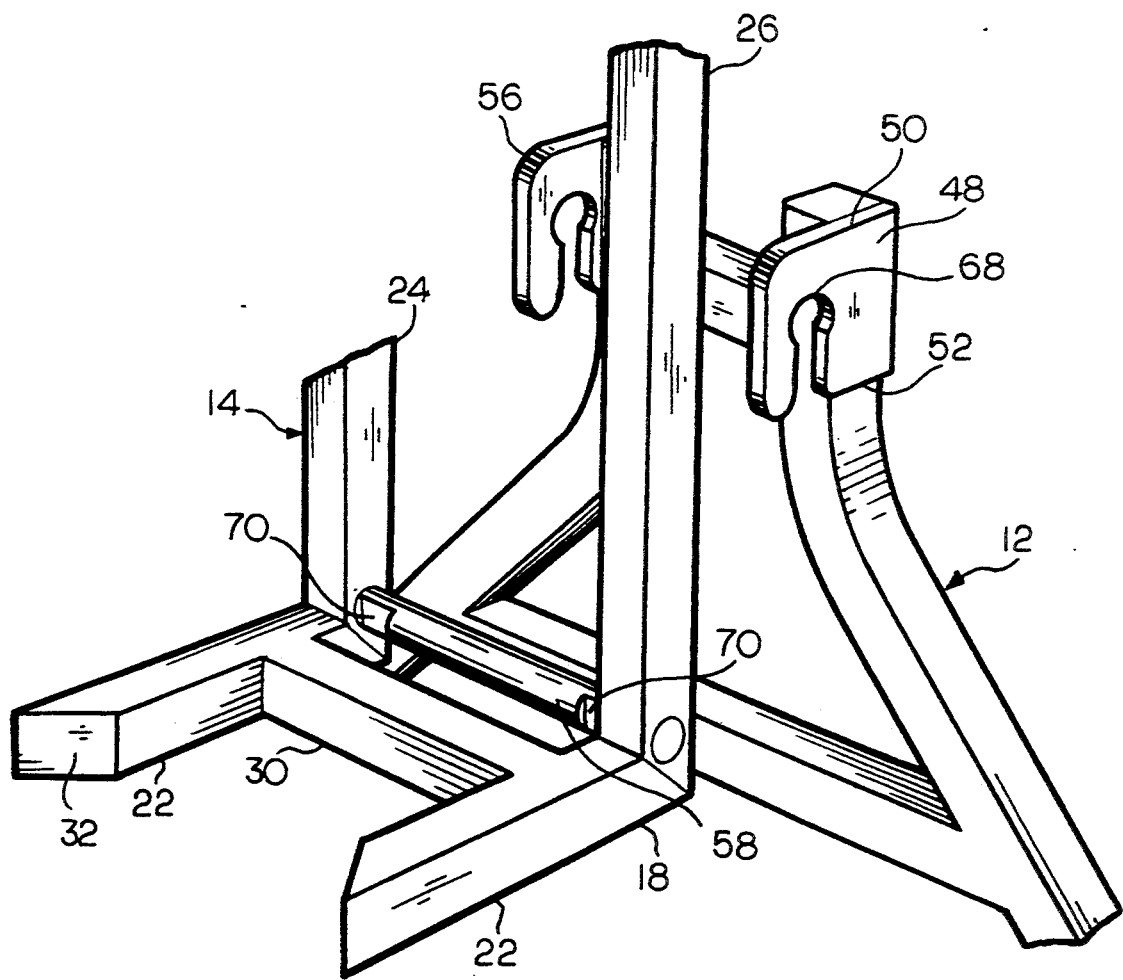
FIG. 9 is a partial view of an alternative embodiment of the platform and support bracket of the tree stand.

In an alternative embodiment, as shown in FIG. 9, the interlocking means includes a plate 48 having a forward edge 50 and a rearward edge 52 and a fastening bar 58 extending between members 24 and 26. The plane of the plate 48 extends perpendicular to the longitudinal length of the bottom brace 30 and includes a slot 54 which extends from the rearward edge 52 of the plate forward to a rounded end 68. The diameter of the rounded end 68 is greater than the width of the slot 54. The fastening bar 58 is cylindrical in shape having formed therein at least one pair of opposing flat surfaces 70, and preferably two pair of opposing flat surfaces. The diameter of the bar 58 is greater than the distance between the opposing flat surfaces 70 and the width of the slot 54. The distance between the opposing flat surfaces 70 is less than the width of the slot 54.

The platform 12 is attached to the support bracket 14 by aligning the opening of each slot 54 with the flat surfaces 70 of the fastening bar 58. The slot 54 is then slid over the flat surfaces 70 of the fastening bar 58 until the fastening bar is within the rounded end 68. The platform 12 is then pivoted upward such that the flat surfaces 70 are no longer aligned with the slot 54 and the wider portion of the cylindrical fastening rod 66 abuts against the narrower slot such that the platform is interlocked in position with respect to the support bracket 14.

The platform 12 is then secured in the raised position by the use of cables 60 which are attached to each side of the platform and which extend upward to the top brace 28 thereby retaining the platform in a raised position generally perpendicular to the support bracket 14.

It will be appreciated, in the raised position, the bottom brace 30, fastening bar 58 and plate 48 are sized and positioned to cooperatively interlock the platform with respect to the support bracket thereby preventing the platform from inadvertently separating from the support bracket. Moreover, because of the cooperation between the bottom brace 30, fastening bar 58 and plate 48 the stability of the platform is improved in the raised position.

As shown in FIGS. 1–4, the tree stand 10 in accordance with the present invention may also include a seat 62. The seat 62 is attached to two extending arms 64 which are pivotally connected to a rod 66 extending between the members 24 and 26 beyond the top brace 28. The rod 66 is positioned below the plane of the top brace 28 such that as the seat 62 is lowered the arms 64 pivot on the rod 66 and the rearward end of the arms contact the top side of the top brace 28 thereby supporting the position of the seat in the lowered position. The seat 62 may be easily stowed out of the way to a raised position by merely lifting the seat such that the arms 64 pivot about the rod 66.

It will be appreciated that because the platform 12 and support bracket 14 of the tree stand 10 are formed of separate components, the platform may be disconnected from the support bracket attached to the tree and the platform may be transported to another location for mounting on another support bracket in accordance with the present invention.

Having described presently preferred embodiments it is to be understood that the present invention may be otherwise embodied within the scope of the following claims.

What is claimed is:

1. A tree stand comprising:

(a) a support bracket adapted to be secured to a tree or pole, said support bracket including a frame having a first pair of cleats attached to a top end of said frame and a second pair of cleats attached to a bottom end of said frame, said first pair of cleats and said second pair of cleats each having a complimentary tapered front end to grasp the tree circumference and provide stability to the tree stand when secured to the tree, said frame including two parallel spaced members interconnected by a top brace and a bottom brace, said top brace is connected to each member and extends across an inside of a corner formed at a juncture of each member and each top cleat and said bottom brace extends between and is connected to each bottom cleat of each member a selected distance from a corner formed by each bottom cleat and each member;

(b) a strap of a length of chain fastened around a portion of the tree or pole to opposing ends of said top brace for securing said support bracket to the tree or pole;

(c) a platform including a generally flat planar member for supporting at least one person; and (d) means for releasably interlocking said platform and said support bracket by pivoting said platform with respect to said support bracket to interlock said platform and said support bracket and prevent said platform from inadvertently separating from said support bracket, wherein said interlocking means includes a pair of plates secured to a rearward end of said platform and a fastening bar of a cylindrical shape extending between members and parallel with and in close proximity to said bottom brace, said plates extending perpendicular to a longitudinal length of said bottom brace and each including a slot, said slot being of a size to receive said fastening bar such that as said slot is slid over said fastening bar and said platform is pivoted upward a forward edge of each plate is presented in contact with said bottom brace to interlock said plate between said fastening bar and said bottom brace to prevent said platform from inadvertently separating from said support bracket.

2. The tree stand of claim 1 wherein said plates each include a rounded lower corner to allow said lower corner of each plate to pivot past said bottom brace and perpendicular to said support bracket thereby presenting the forward edge of each plate in contact with said bottom brace.

3. The tree stand of claim 1 wherein said interlocking means includes a pair of plates having a forward edge and a rearward edge and a fastening bar extending between members, each plate having a slot which extends from the rearward edge of said plate forward to a rounded end having a diameter greater than said slot width, said fastening bar having a cylindrical shape and having formed therein at least one pair of opposing flat surfaces, said fastening bar diameter being greater than a distance between said opposing flat surfaces and a width of said slot and a distance between said opposing flat surfaces less than a width of said slot such that said platform is attached to said support bracket by aligning an opening of each slot with said flat surfaces of said fastening bar and sliding said slot over said flat surfaces of said fastening bar until said fastening bar is positioned within said rounded end and then pivoting said platform upward such that said flat surfaces are no longer aligned with said slot and the wider portion of said cylindrical fastening rod abuts against said slot thereby interlocking said platform with respect to said support bracket.

4. The tree stand of claim 3 further including a pair of cables attached at one end to said platform and at the other end to said support bracket for retaining said platform in a raised position generally perpendicular to said support bracket.

5. The tree stand of claim 3 further including a seat, said seat pivotally connected to a rod extending between said members.

6. A tree stand comprising:
   (a) a support bracket adapted to be secured to a tree or pole, said support bracket including a frame having two parallel spaced members interconnected by a top brace and a bottom brace and a first pair of cleats attached to a top end of said frame and a second pair of cleats attached to a bottom end of said frame
   (b) a strap fastened to opposing ends of said top brace to secure said support bracket to a tree or pole;
   (c) a platform including a generally flat planar member for supporting at least one person; and
   (d) a pair of plates secured to a rearward end of said platform and a fastening bar of a cylindrical shape extending between members and parallel with and in close proximity to said bottom brace, said plates extending perpendicular to a longitudinal length of said bottom brace and each including a slot, said slot being of a size to receive said fastening bar such that as said slot is slid over said fastening bar and said platform is pivoted upward a forward edge of each plate is presented in contact with said bottom brace to interlock said plate between said fastening bar and said bottom brace to prevent said platform from inadvertently separating from said support bracket.

7. The tree stand of claim 6 wherein said first pair of cleats and said second pair of cleats each have a complimentary tapered front end to grasp the tree circumference and provide stability to the tree stand when secured to the tree.

8. The tree stand of claim 7 wherein said plates each include a rounded lower corner to allow said lower corner of each plate to pivot past said bottom brace and perpendicular to said support bracket thereby presenting a forward edge of each plate in contact with said bottom brace.

9. The tree stand of claim 8 wherein said strap is a length of chain.

10. The tree stand of claim 8 further including a pair of cables attached at one end to said platform and at the other end to said support bracket for retaining said platform in a raised position generally perpendicular to said support bracket 11. A tree stand comprising:
   (a) a support bracket adapted to be secured to a tree or pole, said support bracket including a frame having two parallel spaced members interconnected by a top brace and a bottom brace and a first pair of cleats attached to a top end of said frame and a second pair of cleats attached to a bottom end of said frame
   (b) a strap fastened to opposing ends of said top brace to secure said support bracket to a tree or pole;
   (c) a platform including a generally flat planar member for supporting at least one person; and
   (d) at least one pair of plates having a forward edge and a rearward edge and a slot which extends from the rearward edge of said plate forward to a rounded end having a diameter greater than said slot width, and a fastening bar extending between members and having a cylindrical shape and having formed therein at least one pair of opposing flat surfaces, said fastening bar diameter being greater than a distance between said opposing flat surfaces and a width of said slot and a distance between said opposing flat surfaces being less than a width of said slot such that said platform is attached to said support bracket by aligning an opening of each slot with said flat surfaces of said fastening bar and sliding said slot over said flat surfaces of said fastening bar until said fastening bar is positioned within said rounded end and then pivoting said platform upward such that said flat surfaces are no longer aligned with said slot and the wider portion of said cylindrical fastening rod abuts against said slot thereby interlocking said platform with respect to said support bracket.

12. The tree stand of claim 11 wherein said first pair of cleats and said second pair of cleats each have a complimentary tapered front end to grasp the tree circumference and provide stability to the tree stand when secured to the tree.

13. The tree stand of claim 12 further including a pair of cables attached at one end to said platform and at the other end to said support bracket for retaining said platform in a raised position generally perpendicular to said support bracket.

* * * * *